C. E. ARCHIE.
VARIABLE SPEED GEARING.
APPLICATION FILED AUG. 1, 1911.
1,011,555.
Patented Dec. 12, 1911.
2 SHEETS—SHEET 1.
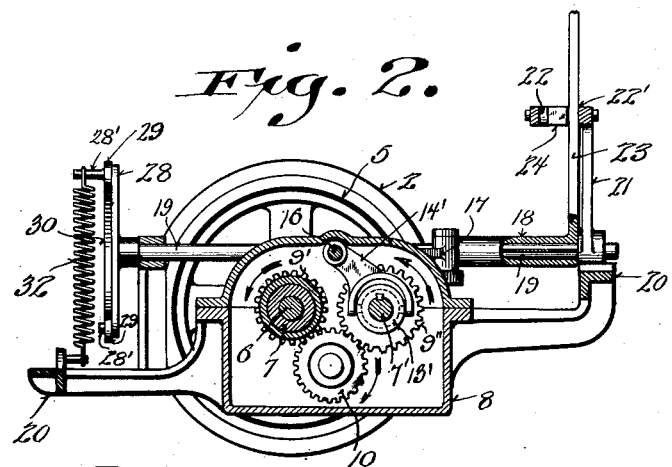
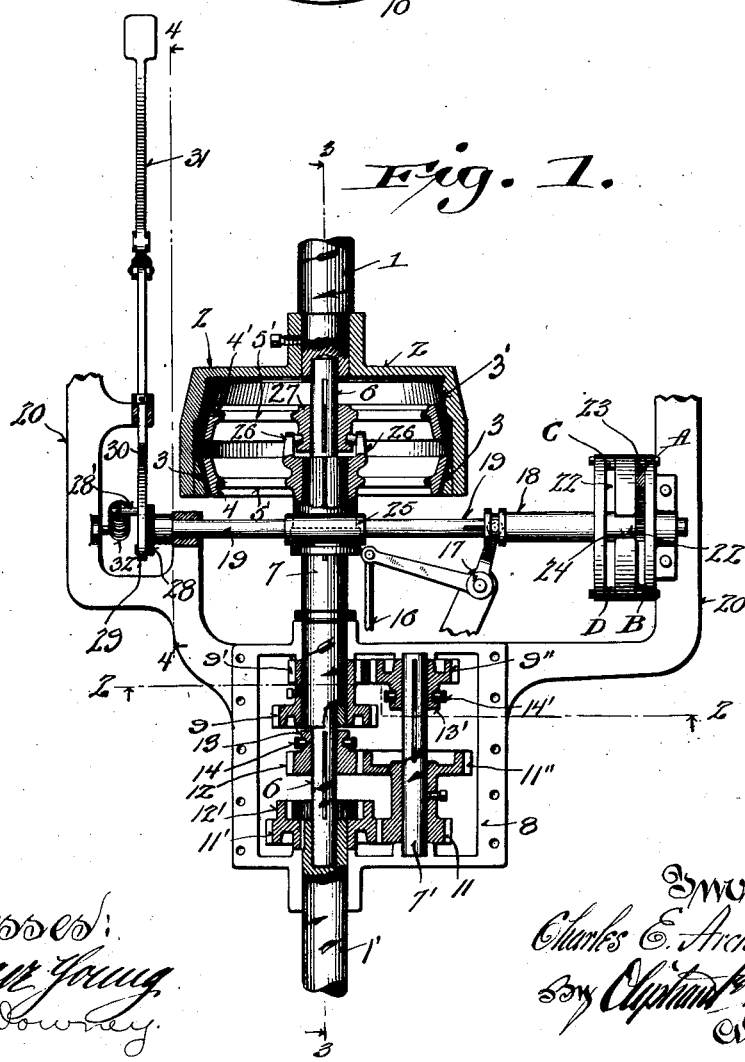

C. E. ARCHIE.
VARIABLE SPEED GEARING.
APPLICATION FILED AUG. 1, 1911.

1,011,555.

Patented Dec. 12, 1911.
2 SHEETS—SHEET 2.

UNITED STATES PATENT OFFICE.

CHARLES E. ARCHIE, OF WATERLOO, WISCONSIN.

VARIABLE-SPEED GEARING.

1,011,555.      Specification of Letters Patent.      Patented Dec. 12, 1911.

Application filed August 1, 1911. Serial No. 641,834.

*To all whom it may concern:*

Be it known that I, CHARLES E. ARCHIE, a citizen of the United States, and resident of Waterloo, in the county of Jefferson and State of Wisconsin, have invented certain new and useful Improvements in Variable-Speed Gearing; and I do hereby declare that the following is a full, clear, and exact description thereof.

The object of my invention is to provide a simple, economical and effective variable speed and reverse gearing and a controlling mechanism therefor, the construction and arrangement of said controlling mechanism being such that, by various movements of a single lever, high, low, and an intermediate speed is imparted to a driven shaft and the direction of rotation of said shaft reversed at the will of the operator. By employing a single controlling lever for the speed gearing it will readily be understood that complications and confusions incidental to the various shifts of the gearing are eliminated.

With the above objects in view the invention consists in certain peculiarities of construction and combination of parts as fully set forth hereinafter with reference to the accompanying drawings and subsequently claimed.

Figure 3:
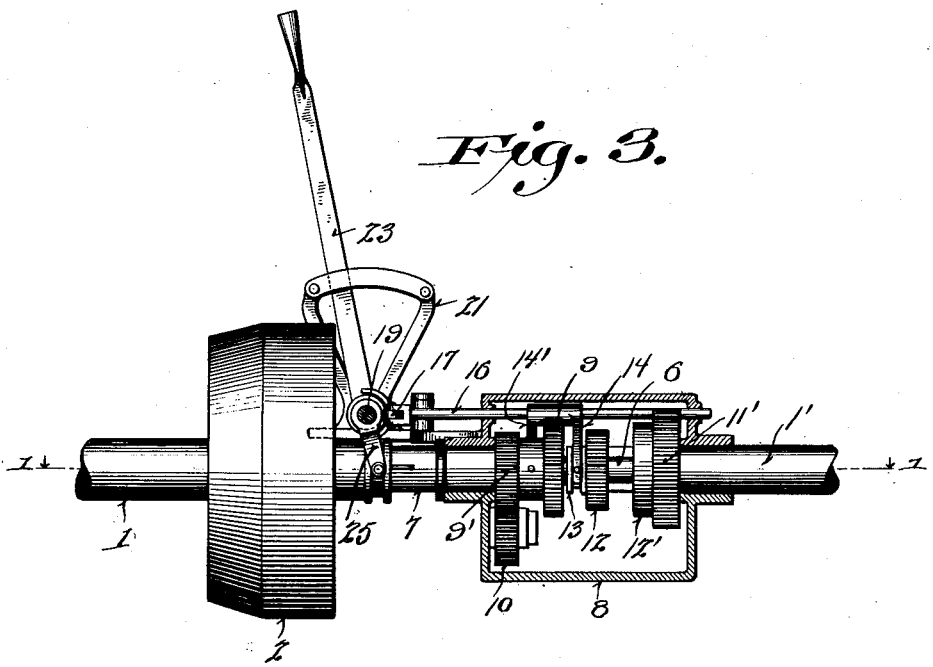

In the drawings Figure 1 represents a plan view with parts removed and parts in section of a variable speed gearing mechanism and controlling lever therefor embodying the features of my invention; the section being indicated by line 1—1 of Fig. 3; Fig. 2, a cross-section of the same, as indicated by line 2—2 of Fig. 1; Fig. 3, a longitudinal elevation of the mechanism partly in section as indicated by line 3—3 of Fig. 1, and Fig. 4, a detailed sectional elevation of a foot lever mechanism for controlling the clutch, the section being indicated by line 4—4 of Fig. 1.

Referring by characters to the drawings, 1 represents a drive shaft having secured to one end thereof a female drive clutch member 2, the same being provided with oppositely disposed inclined internal gripping faces 3, 3', for alternate engagement with corresponding gripping faces 4, 4', of male driven clutch members 5, 5', respectively, through which driven clutch members power is applied either directly or indirectly to a driven shaft 1' that is shown as being alined with the drive shaft. The driven clutch member 5' is in spline connection with an intermediate shaft 6, the ends of which shaft are loosely mounted in end recesses of the drive and driven shafts. A hollow shaft 7 is loosely fitted over the intermediate shaft 6, said hollow shaft serving as a mounting for the driven clutch member 5, which latter is in spline connection with one end thereof. The drive and driven shafts are provided with suitable journal bearings (not shown), one end of the driven shaft and the hollow shaft 7 being journaled in bearings of a gear housing 8, which carries a train of gears connecting the drive and driven shafts, that are arranged as follows: The hollow shaft 7 has secured thereto within the housing a large forward drive gear-wheel 9 and a smaller reverse drive gear-wheel 9', which gear-wheels, for convenience, are combined as shown to constitute a two-faced single wheel. The reverse gear-wheel 9' is in constant mesh with an idle gear-wheel 10 that is loosely mounted upon a stud carried by the housing. The idle gear-wheel 10, together with the forward drive gear-wheel 9, is arranged to mesh with a shift gear-wheel 9'', which latter is in spline connection with a counter-shaft 7', the same being journaled in boxes with which the housing is provided. Motion from the counter-shaft 7' is transmitted to the driven shaft 1' through a gear-wheel 11 that is secured to said counter-shaft and is permanently meshed with a larger gear-wheel 11', the latter being secured to the adjacent end of said drive-shaft 1', whereby the same is driven forwardly in first and second speed or is reversed. First forward speed is imparted to the driven shaft through gear-wheels 11 and 11' by means of a coupling gear-wheel 12, which is adapted to be brought into mesh with a larger gear-wheel 11'' that is secured to the counter-shaft 7', the last named gear-wheel being shown as a part of the smaller gear-wheel 11. The coupling gear-wheel 12 is in spline connection with the intermediate shaft 6, and, as shown in Fig. 1 of the drawings, is moved to a position where it is meshed with the gear-wheel 11'''. When it is desired to impart direct forward or third speed to the driven shaft 1', the coupling gear-wheel 12 is slid forwardly upon its shaft whereby it engages an internal toothed coupling ring 12' that forms part of the gear-wheel 11' and thus motion from the shaft 6 is directly transmitted to the driven shaft, while the counter-shaft is rotated in a reverse direction through gear-wheels 11, 11'.

The coupling-gear-wheel 12 and shift gear-wheel 9" are each provided with grooved collars 13, 13' for the reception of spanner arms 14, 14' respectively, which spanner arms are carried by a shift-rod 16. The shift-rod 16 is fulcrumed to one arm of a bell-crank lever 17, the opposite arm of which lever terminates with spanner fingers for engagement with the grooved end of a sleeve 18, the latter being in spline connection with a rock-shaft 19 which is disposed transversely of the gear mechanism and suitably journaled within bearings of a frame 20 that constitutes part of the machine to which the reversible speed gear mechanism is applied. One of the bearings for the rock-shaft carries a sector bracket 21 having slots 22, 22' which constitute guides for a hand-lever 23, the slots being connected by a centrally disposed throat 24, whereby the hand-lever may be shifted in a longitudinal direction upon the rock-shaft from one slot to the other, said hand-lever being secured to the sleeve 18, whereby the same is adjusted longitudinally of said rock-shaft.

The driven clutch member 5 is provided with a grooved hub for engagement with arms of a spanner 25, which arms depend from the rock-shaft in the opposite direction from the hand-lever 23, said spanner being rigidly secured to the rock-shaft.

Shifting movement is imparted to the driven clutch member 5' from the drive clutch member 5 through spanner arms 26 which product from the hub of the clutch member 5 and engage a groove in the hub 27 of the driven clutch member 5'.

Figure 4:
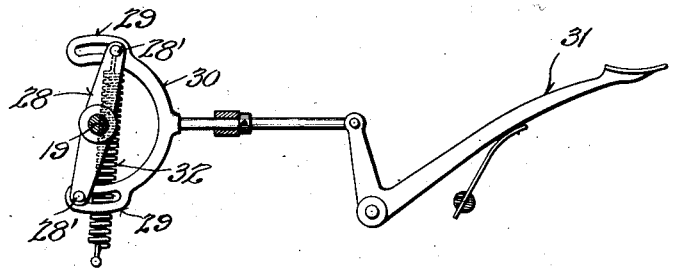

By the above described connection between the driven members it will be observed that, while they are arranged to be shifted together, they are free to turn in opposite directions with respect to each other, their longitudinal shift being controlled by oscillatory movement of the rock-shaft through its spanner connection with the grooved hub of the driven member 5. In order to control the shift of the driven clutch members, in an emergency, the end of the rock-shaft has secured thereto, as best shown in Fig. 4, an arm 28 that extends in opposite directions from said rock-shaft, the ends thereof being provided with pins 28' having reduced ends which engage circular slotted heads 29 of a yoke 30, the said pins being reduced to permit play in the slots in order to prevent binding therein incidental to movement of the yoke. The yoke is provided with a stem 30' that is suitably supported from the frame, the end of the stem being connected to a spring-controlled bell-cranked foot lever 31, whereby the yoke is manipulated.

In order to hold either one of the driven clutch members into engagement with its respective gripping face of the driven clutch member 2, the rock-shaft 19 is under control of a coiled spring 32, one end of which coiled spring is rigidly secured to the frame 20, while the opposite end is connected to the upper pin 28' of the rock-arm 28, and, owing to the position of the anchored point of the coiled spring 32, when the rock-shaft is moved in either direction, the tension of the coiled spring is exerted to hold said rock-shaft in its shifted position and thus said tension is exerted to cause the proper amount of frictional grip between the clutch members.

From the foregoing described foot-controlled mechanism it will be seen that if, in an emergency, it is desired to disconnect that clutch member which is in engagement with the driven clutch member, power being applied to the foot treadle, the pin and slot connection between the yoke and arm 28 will cause said arm to move to a central position with relation to the head slots 29 and thus in said position both of the driven clutch members will be freed from the driving clutch member.

Referring to Fig. 1 of the drawings, the controlling lever 23 is shown shifted to the extreme end A of the sector slot 22' and the lever, when resting in this end, is in its reverse position. In the reverse position the driven clutch member 5 is in clutch connection with the drive clutch member 2 and thus said driven clutch member will impart motion through its hollow shaft 7 to the reverse gear-wheel 9' in the direction of the arrow as indicated. The reverse gear, in turn, transmits motion to the counter-shaft through the idle gear-wheel 10 and shift gear-wheel 9", and from said counter-shaft power is transmitted to the driven shaft 1', through gear-wheels 11, 11', whereby said driven shaft is rotated in the opposite direction from the drive shaft. To impart forward motion to the driven shaft or "first speed," the controlling lever 23 is shifted in slot 22' to its opposite end marked B. This movement does not affect the gear train whatever, but disconnects the driven clutch member 5 and connects the driven clutch member 5' to the drive clutch member 2. Hence it will be seen that motion is now imparted to the intermediate shaft 6 in a direction as indicated by the arrow, causing the counter-shaft, through its gear connections 12 and 11", to impart a slow forward drive to the driven shaft in the opposite direction from that just mentioned. It will also be observed that, incidental to forward drive being imparted to the driven shaft, that the shift gear-wheel 9" of the counter-shaft will also impart rotation to the hollow shaft 7 in a reverse direction through gears 10 and 6, but this idle movement will not affect the operation owing to the fact that the driven clutch member 5 is disengaged. The second speed is obtained by first rocking the controlling lever 23 to a central position with respect to the sector slot 22'. This movement will cause disengagement of the driven clutch member 5', both of said driven clutch members being now freed from the drive clutch member. The controlling lever 23 is then pushed forward through the throat 24, to the sector slot 22 and in effecting the change of position of said controlling lever the sleeve 18, which is secured thereto, is moved longitudinally of the rock-shaft 19, causing motion to be imparted to the bell-crank 17, whereby the spanner connections 14, 14', with the coupling gear-wheel 12 and the shift gear-wheel 9'', will cause said gear-wheels to move outwardly upon their respective shafts, causing gear-wheels 12 to engage the coupling ring 12' and gear-wheel 9'' to engage the large gear-wheel 9. Second speed is then obtained by rocking the controlling lever 23 to that end of the sector slot 22 indicated at C, whereby the driven clutch member 5 is brought into engagement with the drive clutch-member. Motion will thus be imparted from the hollow shaft 7 to the counter-shaft 7' through gear-wheels 9, 9'', and from said counter-shaft motion is imparted to the driven shaft 1' through gear-wheels 11, 11', whereby the driven shaft will be rotated at second or intermediate speed in a forwardly direction and, in connection with this movement it will also be observed that the intermediate shaft 6 will be rotated idly owing to it being coupled with the driven shaft, the disengaged driven clutch member 5' being also rotated therewith. Now, should it be desired to obtain third or high speed, the controlling lever is simply shifted from position C to position D into sector slot 22, whereby the driven clutch member 5' is coupled to the drive clutch member, incidental to the driven clutch member 5 being freed therefrom. Thus power will be transmitted through shaft 6 and its coupling connection 12, 12', directly to the driven shaft 1', whereby said drive and driven shafts are rotated at a uniform speed, while the driven clutch member 5 is rotating idly in the same direction through drive imparted thereto from the counter-shaft and the meshed gears 9'', 9.

From the foregoing description it should be understood that the several specific mechanisms for accomplishing the results desired may be varied indefinitely in accordance with the knowledge of skilled mechanics, the drawings showing simply one method of carrying out my invention, which method is illustrated for clearness, whereby various mechanical details are dispensed with. It should also be understood that the device, while being particularly designed for motor-driven vehicles, can be used in connection with any mechanism wherein variations of the speed are required or that the direction of rotation is to be reversed, the essential element being means whereby a single controlling lever is capable of various movements for obtaining two or more speeds and reverse in connection with a drive and driven members.

I claim:

1. A variable speed gearing comprising a drive and driven shaft, a drive clutch member secured to the drive shaft, an intermediate shaft interposed between the drive and driven shafts, a hollow shaft loosely mounted about the intermediate shaft, driven clutch members carried by the intermediate and hollow shafts for alternate engagement with the drive clutch member, a gear train connecting the intermediate and hollow shafts with the drive shaft, a controlling lever, a clutch shifting mechanism connecting the controlling lever and driven clutch members, whereby they alternately engage the drive clutch member incidental to movements of the lever in one line, and an independent gear-shifting mechanism connecting said controlling lever and gear train, whereby the speed of the driven shaft is varied and its direction of rotation reversed incidental to a series of distinct movements of said lever at an approximate right angle to its alined clutching movements.

2. A variable speed gearing comprising a drive and driven shaft, a drive clutch member secured to the drive shaft, an intermediate shaft interposed between the drive and driven shafts, a hollow shaft loosely mounted about the intermediate shaft, driven clutch members carried by the intermediate and hollow shafts, a gear train connecting the said intermediate and hollow shafts with the driven shaft, a rock-shaft, means carried by the rock-shaft for actuating the driven clutch members, a lever in spline connection with the rock-shaft, and a shift mechanism in connection with the lever and certain of the gears of the before mentioned gear train, oscillation of the lever being adapted to operate the driven clutch members said lever being reciprocated to control movements of the gear train whereby the speed of the driven shaft is increased or diminished in one direction or reversed.

3. A variable speed gearing comprising a drive and driven shaft, a drive clutch member secured to the drive shaft, an intermediate shaft interposed between the drive and driven shafts, a hollow shaft loosely mounted about the intermediate shaft, driven clutch members carried by the intermediate and hollow shafts, a pair of gears carried by the hollow shaft, an idle gear in meshed engagement with one of the hollow shaft gears, a counter-shaft, a shiftable gear in spline connection with the counter-shaft for engagement with one of the hollow shaft gears or the idle gear, a second pair of gear-wheels secured to said counter-shaft, a gear-wheel carried by the drive shaft for engagement with one of the secured counter-shaft gear wheels, a gear-wheel in spline connection with the intermediate shaft the gear-wheel being adapted to have meshed engagement with one of the before mentioned gear-wheels that are secured to the counter-shaft, means for coupling the shiftable gear of the intermediate shaft with the driven shaft, a controlling lever, a shifting means connecting the controlling lever driven clutch members of the intermediate and hollow shafts, and a second shifting means connecting said controlling lever and the shiftable gear-wheels carried by the intermediate shaft and the counter-shaft.

In testimony that I claim the foregoing I have hereunto set my hand at Waterloo in the county of Jefferson and State of Wisconsin in the presence of two witnesses.

CHARLES E. ARCHIE.

Witnesses:
RAY C. TWINING,
ALEX ARCHIE.